United States Patent
Deluca et al.

(10) Patent No.: US 9,188,227 B2
(45) Date of Patent: Nov. 17, 2015

(54) SEALING ARRANGEMENTS

(75) Inventors: George Deluca, Deer Park, TX (US);
Brian Hasha, Deer Park, TX (US);
Jamal Jamlyaria, Deer Park, TX (US);
John Hoyes, Todmorden (GB); Stephen Peter Bond, Houston, TX (US)

(73) Assignee: Flexitallic Investments, Inc., Kingwood, TX (US)

( * ) Notice: Subject to any disclaimer, the term of this patent is extended or adjusted under 35 U.S.C. 154(b) by 971 days.

(21) Appl. No.: 13/254,744

(22) PCT Filed: Feb. 26, 2010

(86) PCT No.: PCT/GB2010/050341
§ 371 (c)(1),
(2), (4) Date: Nov. 30, 2011

(87) PCT Pub. No.: WO2010/100469
PCT Pub. Date: Sep. 10, 2010

(65) Prior Publication Data
US 2012/0068415 A1 Mar. 22, 2012

(30) Foreign Application Priority Data

Mar. 2, 2009 (GB) .................................. 0903462.0
Aug. 19, 2009 (GB) .................................. 0914512.9

(51) Int. Cl.
*F16J 15/08* (2006.01)
*F16J 15/12* (2006.01)

(52) U.S. Cl.
CPC .................................. *F16J 15/125* (2013.01)

(58) Field of Classification Search
CPC .................. F16J 15/121; F16J 15/125
USPC .................................. 277/312, 316, 610, 633
See application file for complete search history.

(56) References Cited

U.S. PATENT DOCUMENTS

| 535,713 | A | * | 3/1895 | Michalk | 277/633 |
|---|---|---|---|---|---|
| 816,478 | A | | 3/1906 | Kirschning | |
| 3,905,090 | A | | 9/1975 | Painter | |
| 4,189,819 | A | * | 2/1980 | Nicholson | 29/417 |
| 4,650,070 | A | | 3/1987 | Oka et al. | |
| 5,082,296 | A | * | 1/1992 | Aizawa et al. | 277/610 |
| 5,308,090 | A | * | 5/1994 | Hamada et al. | 277/610 |
| 5,683,091 | A | * | 11/1997 | Isoe et al. | 277/610 |
| 5,913,522 | A | | 6/1999 | Koch | |
| 5,997,007 | A | * | 12/1999 | Hanashima et al. | 277/610 |

(Continued)

FOREIGN PATENT DOCUMENTS

| GB | 1026327 | 4/1966 |
|---|---|---|
| GB | 1527344 | 10/1978 |

(Continued)

OTHER PUBLICATIONS

Office Action in related Japanese Application No. 2011-552514, dated Oct. 15, 2013, 5 pages.

(Continued)

*Primary Examiner* — Gilbert Lee
(74) *Attorney, Agent, or Firm* — Kilpatrick Townsend & Stockton LLP

(57) ABSTRACT

A spirally wound strip (300) is thicker in the middle and is curved on both sides. Short flats (306) are formed at each side by surfaces that converge towards each other. Soft sealant material (316) extends over the flats (306).

21 Claims, 5 Drawing Sheets

(56) References Cited

U.S. PATENT DOCUMENTS 8,505,922 B2 * 8/2013 Henne et al. .............. 277/312
2007/0176373 A1 8/2007 Suggs et al.

FOREIGN PATENT DOCUMENTS

| | | |
|---|---|---|
| JP | 60177372 | 11/1985 |
| RU | 2179675 | 2/2002 |

OTHER PUBLICATIONS

Examination Report in related Republic of Kazakhstan Application No. 2011/1610.1, dated Jun. 17, 2013, 2 pages.
Office Action in related Chinese Application No. 201080010108.9, dated Aug. 27, 2013, 8 pages.
Examination Report in related UK Application No. GB 09145129 dated Dec. 4, 2012, 3 pages.
International Preliminary Report on Patentability dated Sep. 6, 2011 in related International Application No. PCT/GB2010/050341.
Piwen, E.G., Dichtungskonstruktionen mit Metalleinlage (Seals with Metal Core). Gummi, Fasern, Kunststoffe, ISSN 0176-1625, Aug. 1992, pp. 394 and 396-397, vol. 45, No. 8, Gupta, Stuttgart, Germany.
International Search Report dated Jun. 10, 2010 in related International Application No. PCT/GB2010/050341.

* cited by examiner

SEALING ARRANGEMENTS

PRIOR RELATED APPLICATIONS

The present application is a national phase of PCT/GB2010/0050341 filed Feb. 26, 2010, which claims the benefit of priority of Great Britain patent application number 0903462.0 filed Mar. 2, 2009, which claims the benefit of priority to Great Britain patent application number 0914512.9 filed Aug. 19, 2009 each of which is incorporated herein by reference in its entirety.

The present invention relates to a seal arrangement, a method of forming a seal arrangement and a method of effecting a seal.

WO 93/07407, US2007/0176373, U.S. Pat. No. 6,926,285, EP 606281 and U.S. 5,913,522 disclose types of gaskets that comprise a spirally wound metal strip of constant thickness with sealant material located between the spiral metal strip. The metal strip includes edge regions that extend perpendicularly to the parts that clamp the gasket and which the gasket is arranged to effect a seal between. U.S. Pat. No. 5,308,090 discloses a similar type of gasket in which the metal strip zig-zags across the region to be sealed.

PCT/JP/03796 and RU 2 179 675 disclose a spirally wound strip having a V section. DE 1974 7266 discloses a strip with a trough section. GB 1 298 987 discloses a strip, the middle of which includes a concave portion on one side and a convex portion on the other side that nest within each other.

GB 1 527 344 discloses a spirally wound gasket which has thickening in the middle of the gasket and thickening at the sides.

Such gaskets are useful in providing seals for pressures less than those provided by what are known as Kammprofile seals where a solid steel gasket is provided with outwardly extending ridges facing the surfaces to be sealed. Such gaskets are shown in WO 94/29620, US 2004/0118510 and WO2005/052414 for instance.

However neither the spiral wound gasket nor the Kammprofile gasket discloses a gasket for use in high and low pressure sealing arrangements that can also expand or contract and maintain the seal over a significant degree of movement.

It is an object of the present invention to attempt to overcome at least one of the above or other disadvantages.

The present invention is defined in the claims and elsewhere in this specification. Any of the features may be combined.

According to one aspect of the present invention a seal arrangement includes a spirally wound strip, opposed sides of which are arranged, in use, to be clamped between opposed faces to be sealed in which the length of a line from a surface of the strip that faces inwardly to a surface that extends outwardly which line is perpendicular to at least one of those surfaces, varies going from one side region to the other side region.

The length of the line may be greater at a middle region than it is at a side region.

When the length of the line is greater at the middle region than at side regions the side regions are able to flex under relatively low pressures and the thicker middle region is still abel to flex under relatively high pressures.

According to another aspect of the present invention a seal arrangement includes a spirally wound strip opposed sides of which are arranged, in use, to be clamped between opposed faces to be sealed, each side of the strip being defined by first and second surfaces of the strip that converge towards each other as they extend outwardly towards the side.

Outer side regions of the strip may be arranged, in use, to flex more than an inner region.

The inner region of the strip may be of greater thickness than the outer side regions.

The arrangement may include a first and second spirally wound strip whereby a winding of the first strip is arranged to be adjacent to a winding of the second strip, at least one of the turns being arranged, in use, to be clamped between opposed faces to seal those faces with the first and second spirals having different properties.

The first surface is at an angle to a line extending from one side of the strip to the other side. The second surface is at an angle to a line extending from one side of the strip to the other side.

The inclusive angle of at least one of the first or second surfaces at the side to the line is less than 80 or 60 or 50 or more than 20 or 30 or 40 or in the region of 45°.

At least one of the first or second surfaces may be curved.

At least one of the first or second surfaces may be straight.

A first face may extend either inwardly or outwardly with respect to the spiral and a second face may extend in the opposite direction.

End regions of the curve may define the first surface at each side.

Ends of a curve may define the inner region of the second surfaces.

The width of the strip may vary from one side to the other and the strip may be thicker in a middle region than at side regions.

The shortest line between two faces may be constant along side regions of the strip.

The shortest line between two faces may vary across the middle region.

The length of the shortest line between two faces may be greatest in the middle of the strip.

The width or the average width of the strip relative to the height of the strip may be more than 1:2 or 1:3 or 1:4 or in the region of 1:5.

One of the first or second strip may be thinner than the other of the first or second strip over at least part of its depth.

At least one of the first or second strip may be of greater height than the other or the first or second strip.

According to another aspect of the present invention a method of forming a seal arrangement comprises making a strip and winding the strip into a spiral, opposed sides of the strip, in use, being arranged to be clamped between opposed faces to be sealed and whereby each side of the strip is defined by first and second surfaces of the strip that converge towards each other as they extend outwardly towards the side.

The method may comprise making the strip more resistant to bending at an inner region than at side regions.

According to another aspect of the present invention, a method of effecting a seal between two faces with a seal arrangement comprising a spirally wound strip with relatively soft sealant material extending over the sides of the strip and with each side of the strip being defined by surfaces that converge towards each other as they extend outwardly towards the side comprising clamping the opposed sides between the faces with the relatively soft sealant material being trapped between the sides of the strip and the faces to assist in effecting the seal.

The method may comprise causing greater flexure of the strip to occur at outer side regions of the strip than the middle region when effecting the seal.

The method may comprise a first and a second spirally wound strip being wound adjacent to each other with at least one of the first or second strips affording different resistance to the clamping force than the other of the first or second strip.

The method may comprise one of the first or second strips being of greater height than the other of the first or second strip prior to the clamping force being applied with the height of the strips being the same as the applied force increases.

According to a further aspect of the present invention a seal arrangement includes a spirally wound strip opposed sides of which are arranged, in use, to be clamped between opposed faces to be sealed characterised in that the inwardly and outwardly facing surfaces of the strip are curved and in that the curves are of different shape on the inwardly and outwardly facing surfaces.

At least one and preferably both curves include arcs and where both are arcs the radius of each arc may be different.

According to another aspect of the present invention a seal arrangement comprises a spirally wound strip opposed sides of which are arranged, in use, to be clamped between opposed faces to seal those faces, the outer side regions of the strip being arranged, in use, to flex more than an inner region.

Each side of the strip may be defined by first and second surfaces that are arranged to converge towards each other as they extend outwardly towards their respective sides.

The inner region of the strip may be of greater thickness than the outer side regions.

The seal arrangement may comprise a first and second spirally wound strip whereby a winding of the first strip is arranged to be adjacent to a winding of the second strip, at least one of the turns being arranged, in use, to be clamped between opposed faces to seal those faces with the first and second spirals having different properties.

According to a further aspect of the present invention a seal arrangement comprises a spirally wound strip opposed sides of which spiral are arranged, in use, to be clamped between opposed faces to seal those faces, the inner region being of greater thickness than the outer side regions.

Each side of the strip may be defined by first and second surfaces that are arranged to converge towards their respective sides.

The outer side region of the strip may be arranged, in use, to flex more than the inner region.

The seal arrangement may comprise a first and second spirally wound strip whereby a winding of the first strip is arranged to be adjacent to a winding of the second strip, at least one of the turns being arranged, in use, to be clamped between opposed faces to seal those faces with the first and second spirals having different properties.

According to another aspect of the present invention, a seal arrangement includes a spirally wound strip opposed sides of which spiral are arranged, in use, to be clamped between opposed faces to be sealed, each side of the strip being defined by first and second surfaces of the strip that converge towards each other as they extend outwardly towards the side, the inner and outer windings of the strip being secured together and the arrangement including relatively soft sealant material located over the sides of the strip.

The sealant material may extend over a succession of windings of the strip and over any spaces between those windings prior to being clamped between any opposed faces to be sealed.

The strip may be radially located within a guide ring.

There may also be an inner guide ring.

The seal arrangement may comprise a first and second spirally wound strip whereby a winding of the first strip is arranged to be adjacent to a winding of the second strip, at least one of the turns being arranged, in use, to be clamped between opposed faces to seal those faces with the first and second spirals having different properties.

According to a further aspect of the present invention a seal arrangement comprises a first and second spirally wound strip whereby a winding of the first strip is arranged to be adjacent to a winding of the second strip, at least one of the strips being arranged, in use, to be clamped between opposed faces to seal those faces is characterised in that the first and second strips have different properties.

The different properties comprise one of the first or second strips being of greater depth than the other of the strips. The strip of greater depth may be arranged to be engaged first as a seal between two faces is begun to be effected. The strip of greater depth may flex as the seal between two faces is effected whereby the width of the strip of greater depth is caused to decrease possibly with the widths of the first and second strip being able to be the same upon application of sufficient pressure between the faces. When the widths of the first and second strips are the same the width of the strip that was initially of smaller width may also have flexed to cause its width to reduce.

The different properties may comprise at least one of the first or second strips being of less width than the other of the first or second strips over at least part of the depth of the strips.

At least one of the strips may be arranged to flex more at outer side regions of the strip than an inner region.

Each side of at least one strip may be defined by first and second surfaces that converge towards each other as they extend outwardly towards their respective sides.

The inner region of at least one strip may be of greater thickness than outer side regions of that strip.

The strip may include a first face extending either inwardly or outwardly with respect to the spiral and a second face extending in the opposite direction. The first face may be curved from one side to the other. The second face may also be curved. The ends of the curve of the second face may end short of the sides of the strip. At least one of the curves may be arcuate along at least part of its extent. The first and second faces may include arcs which may have a common axis or which may have axes spaced from each other, for instance by the width of the middle of the strip. The first face may include an inner region having an arc of less radius than the radius of arcs at outer regions of the first face. The arc of an inner region of the first face may be the same arc as the arc of the second face. The axes of the or each arc may be located on a centre line through the spiral parallel to the opposed sides. The first face may be convex and the second face may be concave. The end region of the first face may have a greater radius than an inner region.

The width of the strip may vary from one side to the other. The strip may be thicker in the middle region than side regions. The shortest line between two faces of a strip may be constant along side regions of the strip. The shortest line between two faces may vary across the middle region. The length of the shortest line between two faces may be greatest in the middle of the strip.

The width or the average width of the strip relative to the height of the strip may be more than 1:2 or 1:3 or 1:4 or in the region of 1:5.

The present invention also includes a method of forming a seal arrangement when the seal arrangement is anywhere as herein referred to.

The present invention also includes a method of effecting a seal between two faces when the seal arrangement is as herein referred to.

The present invention can be carried into practice in various ways but several embodiments will now be described by way of example and with reference to the accompanying drawings, in which:—

Figure 6:
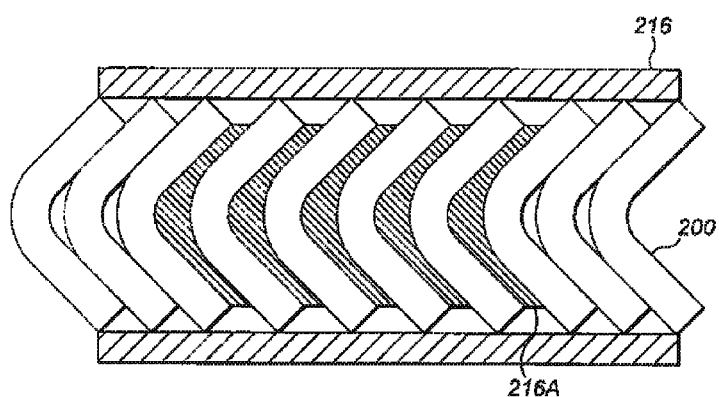
FIGS. 6 and 7 are sectional views through a gasket as shown in FIG. 4 showing the application of gasket material.
Figure 7:
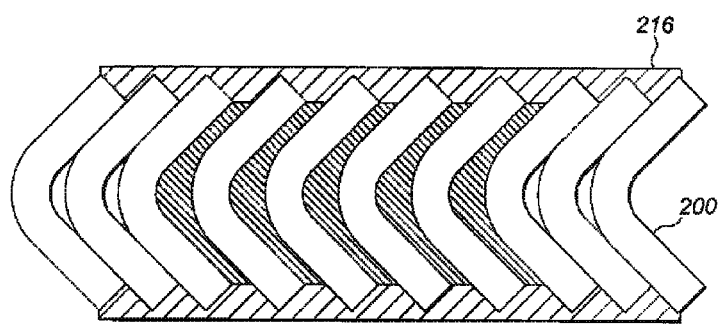
Figure 8:
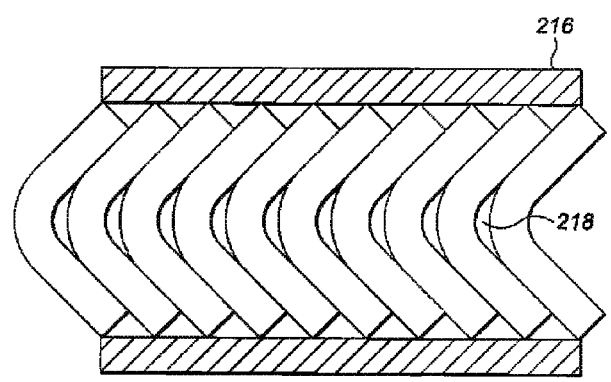
Figure 9:
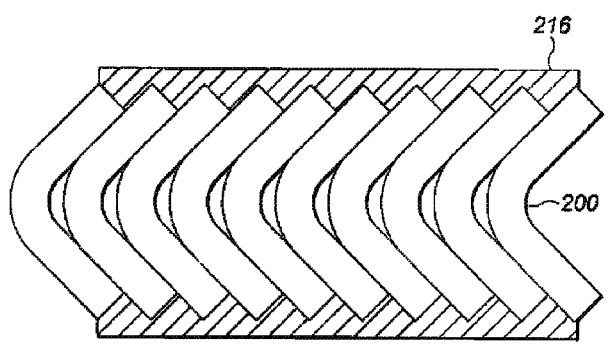
Figure 10:
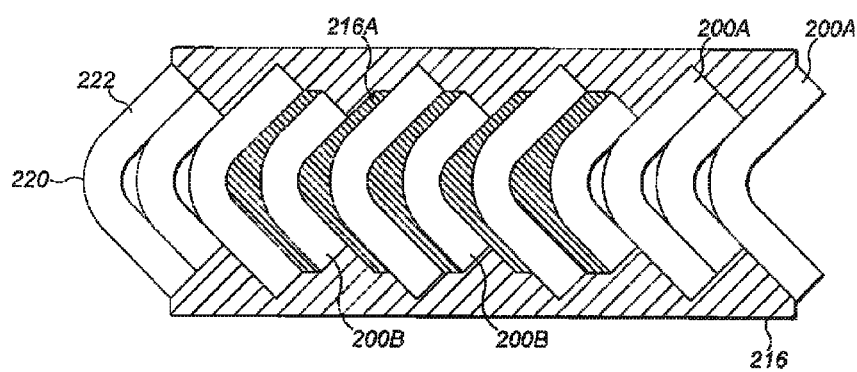
Figure 11:
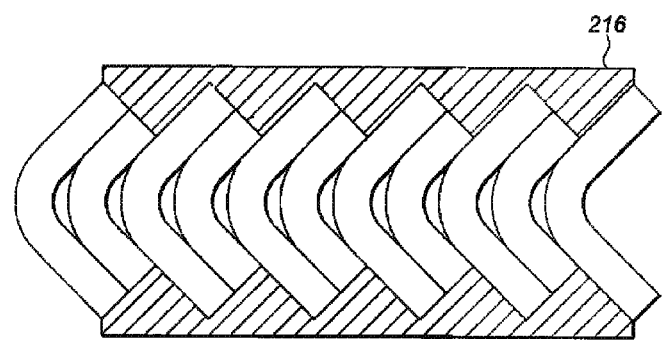

FIGS. 8 and 9 are views similar to FIGS. 6 and 7 without gasket material between adjacent windings, and FIGS. 10 and 11 are views similar to FIGS. 6 to 9.

Figure 1:
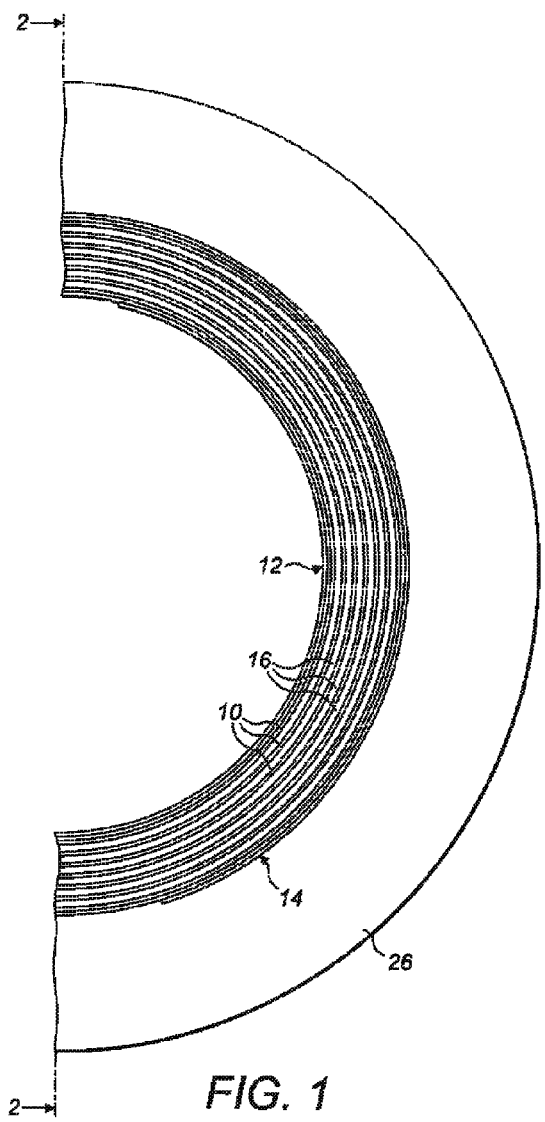
FIG. 1 is a plan view of part of a conventional spiral wound gasket and guide ring.
Figure 2:
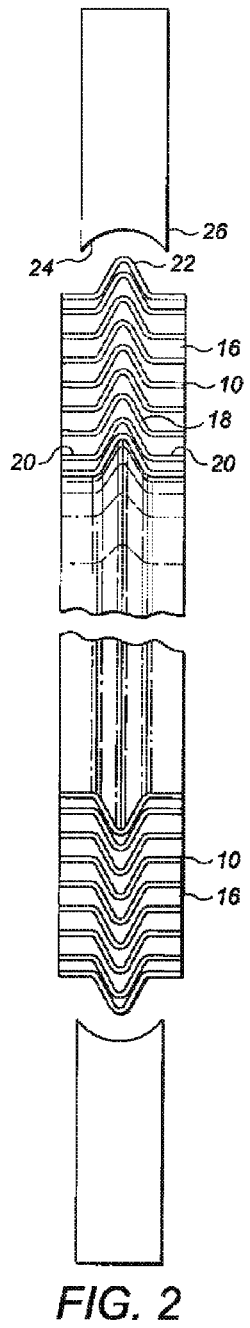
FIG. 2 is a cross-sectional view of FIG. 1 taken on the line 2-2 of FIG. 1.

In FIGS. 1 and 2 a plurality of turns of metal 10 are wound into a spiral. The inner turns 12 and the outer turns 14 are secured by spot welding to adjacent turns. A plurality of turns of relatively soft gasket material 16 are interleaved with the metal turns during winding.

The metal 10 has a "V" profile 18 in the centre with arms 20 extending from the top of each V. The radially outer rim 22 of the metal 10 is able to have its V profile snapped into a recess 24 that has been pressed or machined into a retaining or guide ring 26.

In use the guide ring 26 is used to centre the gasket within the bolt circle of a flanged pipe joint in a well known manner (not shown). Bolts are passed through openings in the guide ring or outwards of the guide ring and the flanges of the two pipes that are to be sealed. These bolts are then tightened. This tightening applies pressure to the front and rear faces of the spiral which deform the V profile 18 until the pipe flanges seat onto the faces of the guide ring 26. Should the pipes expand or contract such that the pressure on the guide ring 26 is eased then the resilience of the compressed V profile 18 will act to urge the spiral into contact with the flanges of the pipes.

There are several disadvantages with such a gasket.

One disadvantage is that the arms 20 ensure that the force from the flanges is transmitted to compress the V profile 18 and consequently the gasket has a wider distance from one side to the other with the distance of the arms occupying redundant space.

Another disadvantage is that the junction between the arms 20 and the V profile 18 is subject to fatigue stress or the V is flexed. Furthermore the base of the V is also subject to fatigue stress.

Figure 3:
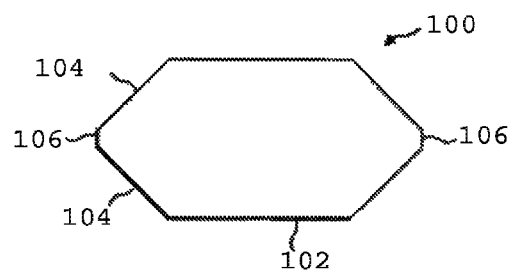
FIG. 3 is a cross-sectional view of a first alternate metal strip that can be used in the spiral.

Referring now to the first embodiment of the invention in FIG. 3, this shows an alternative metal profile strip 100 of FIGS. 1 and 2. In use, the strip is wound into a spiral. Soft gasket material turns may optionally be wound between the metal. Alternatively or additionally, soft gasket material may be applied after winding the metal. The outer and inner metal turns may be spot welded as described in relation to FIGS. 1 and 2. A guide ring holds the gasket in place and the gasket is clamped between the flanges of opposed pipes as previously described.

In the embodiment of FIG. 3 though, when the soft gasket turns are put in place they can extend between the facing sides 102 of adjacent windings. Each side of the strip includes outwardly and converging faces 104 that extend at 45° to the extent across the gasket and that meet in a point or small flat 106 that faces the surface to be clamped. Soft gasket material may fill the space between the faces 104 of adjacent turns. Furthermore, soft gasket material may extend beyond and over each small flat 106 and is located between the flange to be sealed and the flat 106.

When effecting sealing the material between the small flat 106 and the flange is subject to a great force which can further enhance the sealing properties of the gasket.

The sides 102 are 0.089 inches long and the faces 104 each extend a further 0.02 inches to the top and 0.02 inches to the bottom. The flat 106 is formed 0.002 inches from the point where the angled sides 104 would have met. The width of the strip 100 is 0.04 inches but may be 0.06 or 0.09 inches wide. The soft gasket protrudes from the tip to the flange, in an unloaded state, of between, typically 0.02-0.03 inches on each side.

Figure 4:
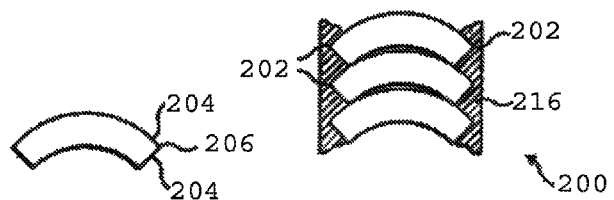
FIG. 4 is a cross-sectional view of a second alternative metal strip used in the spiral.
Figure 5:
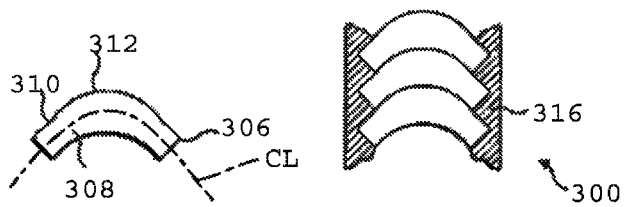
FIG. 5 is a cross-sectional view of a third alternative metal strip.

Referring now to FIGS. 4 and 5, a cross section is shown of three adjacent windings of a curved profile 200 or 300 in an unstressed condition. The inner and outer windings are welded together as previously described.

The profile 200 may be 0.06 to 0.09 inches thick. The profile 200 from top to bottom may be 0.175 inches. The top and bottom of the profile is formed with flats 206 that are parallel with the flange of a pipe that is to be sealed. The inner radius of curvature of the profile 200 is 0.07 inches and the outer radius is 0.1 inches with the arc extending through 90°. The flats 206 may be 0.005 inches.

The surface 204 of the strip extends away from the tip at an angle of 45° on one side and the outer curve extends away from tip 206 at the other side, also at approximately 45°.

There is a difference between the profile of FIG. 5 and that of FIG. 4 in the dimensions. The inner radius 308 of the profile 300 is 0.062 inches and the outer radius 310 at the top and bottom is 0.1 inches. However, the radius 310 only extends to a depth of 0.014 inches from each side. For the remaining 0.107 inches the outer radius 312 is the same as the inner radius, namely 0.062 inches, with the axial centre of the outer radius being shifted from that of the inner axis by the width of the strip In an alternative embodiment the radii 310 are replaced by straight sections as may be the opposed inner part of section 310 in which the parts may have parallel surfaces. Consequently, as seen in FIG. 5, the windings of the profiles 300 are thicker in the middle and fit snugly within each other. The thicker middle portion may or may not flex during clamping and sealing. It is likely that the thinner, outer regions will effect most, if not all of the flexing during clamping at least under low pressure.

Any of the strips may be extruded and may be formed from stainless steel which may be 304 or 316 stainless steel, or various other metal alloys or plastics.

Soft gasket material 216,316 may optionally be wound between the metal. Alternatively or additionally soft gasket material 216,316 may be applied after winding the metal. An inner or an outer guide ring or both may hold the gasket in place and the gasket is clamped between the flanges of opposed pipes as previously described. FIGS. 6 to 11 are views showing the application of the soft gasket material 216 which is laid over each side of the gasket and which is then pushed down to occupy the spaces between the adjacent tips of the profiles, as in FIG. 7. The FIGS. 6 and 7 and FIG. 10 also show the windings having optional sealing material 216A which has been wound with the profile. The material 216 may be different from the material 216A. The materials 216 and 216A may meet when the material 216 is pushed down as shown in FIG. 7.

FIGS. 8, 9 and 11 are views similar to FIGS. 6 and 7 without any gasket material being between adjacent windings and with all adjacent windings 200 contacting each other.

FIGS. 6 and 7 and FIGS. 8 and 9 and FIGS. 10 and 11 could also be shown with the profile 300 replacing the profile 200 or 200A or 200B and with the same description in relation to the gasket material or materials.

FIGS. 4 and 6 to 11 show profiles of equal thickness from one side to another. In an alternative embodiment, not shown, the thickness may vary and the profile may be thickest in the middle and may be shaped as shown in FIG. 5.

In an alternative embodiment (not shown) the gasket may be formed of a double winding of profiles with the profiles having different dimensions or properties. For instance a profile of a particular thickness may be adjacent to a profile that is thicker or thinner. Alternatively or additionally the profiles may have different heights as shown in FIGS. 10 and 11.

In FIGS. 10 and 11 alternate first and second interposed profiles 200A and 200B are shown with the profile 200A having a greater height than the profile 200B. The profiles are wound around a common axis with the profiles being adjacent to each other and overlapping each other. The curvatures may or may not be the same. In FIGS. 10 and 11 the curvatures are shown as being the same. The thickness of the profile 200A of greater height may be thinner or thicker than the thickness of the profile 200B. The profiles 200A may effect a good seal at low load. At high load the height of the profile 200A may reduce relative to the height of the profile 200B and at high load the height of both profiles may be the same.

The profiles shown in FIGS. 8 to 11 have been described as being the same as the profile 200. Alternatively the profile could be as shown with a curve 220 at an inner region and straight arms 222 extending to the top and bottom.

In each of FIGS. 4 and 6 to 11 the adjacent turns of the profile or profiles are not able to nest within each other. In this respect, as seen in FIG. 8 for instance, adjacent turns include a gap 218 in the middle region. This gap 218 is caused by the concave and the convex arcs of the profile having a common axis thereby causing the concave arc to have a smaller radius than the convex radius. The straight section leading off from each side of the curved section is at an angle to the surfaces to be sealed. Consequently the length of the convex arc is greater than the length of the concave arc. Furthermore, the larger radius convex arc is not able to nest within the smaller, adjacent concave arc.

The soft gasket material 216,316 in any embodiment can fill the space between adjacent windings on each side and can extend, in the unloaded state, beyond each flat 206 by a distance of between, typically, 0.02-0.03 inches on each side.

The soft gasket material in any embodiment may be located between all windings of the gasket or some only and may be located around one turn only which may be a turn away from the inner and outer end windings of the gaskets. The sealing material between the windings may be the same as the material that extends beyond the windings or may be of a different material, or various materials which may for instance vary from a region of the spiral that is inwards when compared to the material at an outer region or may vary from an inner depth of the spiral as compared to a region towards one or both sides. Alternatively or additionally one portion such as an inner portion or inner half may be one material and another portion such as an outer portion may be a different material. Alternatively or additionally one material between opposed spirals may be sandwiched between inner and outer materials which may be different inner and outer materials.

Suitable soft gasket materials which comprise the sealant materials for the present invention are those known to the skilled person in both Kammprofile and spiral wound gaskets. Suitable sealant materials include fluorocarbon polymers such as PTFE, asbestos, non-asbestos, exfoliated graphite, exfoliated minerals such as vermiculite and mica, ceramics or mixtures thereof.

The preferred material is exfoliated vermiculite, especially a formulation based on chemically exfoliated vermiculite (CEV).

The sealant materials of the present invention may also incorporate other organic or inorganic substances such as fibers, binders, cements, and the like, that may be needed to form them into compressible strips, tapes, or sheet.

Preferably, the sealant material comprises a CEV component in a proportion of at least 25% w/w of the sealant material, the said CEV component being at least partially derived from dry CEV.

Preferably, the sealant material also comprises a hydrolysis resistant polymer to improve the water resistance of the sealant material, the proportion of the said polymer not exceeding 20% w/w of the sealant material.

Preferably, the sealant material further comprises a plate like filler material, preferably, a milled filler material.

Preferably, the proportion of CEV is at least 30% w/w of the sealant material, more preferably at least 35% w/w of the sealant material.

Typically, the level of CEV falls within the range 25-80% w/w of the sealant material, more typically, 30-75% w/w of the sealant material, most typically 35-70% w/w of the sealant material.

Preferably, the proportion of the said polymer is less than 15% w/w of the sealant material, more preferably, less than 10% w/w. Especially preferred is a level of polymer less than 7.5% w/w, more especially preferred is a level of polymer in the range 0-7.5% w/w of the sealant material. The option of 0% polymer is also advantageous, especially in high temperature applications or applications where the polymer regradation may damage the application such as fuel cells.

Preferably, the chemically exfoliated vermiculite component of the present invention includes sufficiently dry CEV, to provide a wet sealant layer dough with a reduced water content which is capable of being dried before substantial skinning has occurred.

The term hydrolysis resistant polymer includes any suitable elastomer such as silicon and carbon based elastomeric polymers. Suitable polymers for use with the present invention include:— nitrile butadiene rubbers, styrene butadiene rubbers, natural rubber, butyl rubber, siloxanes (particularly organosiloxanes such as dialkyl siloxanes) and ethylene-propyldiene monomer. Diene-based polymers are suitable because they are flexible and hydrolysis-resistant.

Preferably, in accordance with any aspect of the present invention the CEV is mixed with a suitable plate-like filling agent such as thermally exfoliated vermiculite (TEV). Preferably, the filling agent is milled. Preferably, the filling agent comprises less than 75% w/w of the sealant material, more preferably, less than 70% w/w, most preferably, less than 65% w/w of the sealant material. In many cases the TEV content in the layer is less than 55% w/w.

Preferably, the relative ratio of non-dry derived CEV to dry CEV in the dried sealant material is between 0.01:1 and 20:1, more preferably between 0.05:1 and 10:1, most preferably between 0.1:1 and 4:1.

Since CEV is a relatively expensive material compared with gas-exfoliated vermiculite, eg TEV, in a gasket according to the invention, the sealant layer may also comprise particles of gas-exfoliated vermiculite, eg the material may comprise particles of gas-exfoliated vermiculite bonded with the particles of CEV. The material used may be milled or otherwise reduced in particle size to a particle size of less than 50 μm, however, preferably, the particle size of at least a substantial proportion is more than 50 μm, preferably, 50-300 μm, more preferably 50-250 μm, most preferably 50-200 μm. Other possible additives to the sealant material include talc, mica and unexfoliated vermiculite.

By dry CEV is meant CEV having a moisture content of less than 20% w/w, more preferably, less than 10% w/w, most preferably, less than 5% w/w.

Preferably, the dry CEV is prepared by a suitable drying technique. Suitable drying techniques include:—
cake drying and pulverising;
film drying and pulverising;
rotary hot air drying;
spray drying;
freeze drying;
pneumatic drying;
fluidised bed drying of partially dried solid; and
vacuum methods including vacuum shelf drying.

By exfoliated vermiculite herein is meant expanded mineral vermiculite using gas or chemical reaction. The gas may be thermally generated, in which case the product is called "thermally-exfoliated vermiculite" (TEV). The TEV granules formed have a chemical composition which (apart from the loss of water) is virtually identical to that of the raw material. Gas-exfoliated vermiculite may also be made by treating raw vermiculite with a liquid chemical, eg hydrogen peroxide, that penetrates between the silicate sheets and subsequently evolves a gas, eg oxygen, to bring about exfoliation.

CEV is a different form of exfoliated vermiculite formed by treating the vermiculite ore and swelling it in water. The ore is treated with salt solutions to cause exchange of ions with the ore. Subsequently, on washing with water swelling takes place. The swollen material is then subjected to high shear to produce an aqueous suspension of very fine (diameter below 50 μm) vermiculite particles. These particles have a different chemical composition than the original ore. The CEV is usually used as a wet dispersion which has been produced in this way. Dry CEV is obtained by subsequent drying of the dispersion.

When the gaskets of FIGS. 4 and 5 are located their curved profile may be caused to bend and the points or flats 206 or 306 exert a significant pressure on the soft gasket material as the flanges of the pipe are urged towards each other.

The flanges of the gasket may or may not be parked on the guide rings of each gasket.

The flexing of the curved profiles ensures that the points or flats 206 and 306 continue to maintain the pressure at a small region still in a point manner albeit that the angles of the sides leading to the flats relative to the surface to be sealed will change a small amount.

Attention is directed to all papers and documents which are filed concurrently with or previous to this specification in connection with this application and which are open to public inspection with this specification, and the contents of all such papers and documents are incorporated herein by reference.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A gasket for sealing opposed faces, the gasket comprising:
    a strip that is spirally wound to form a spirally wound element having a plurality of windings, the strip comprising
    (i) a first outer convex curved surface that extends from a primary point on a first outer edge of the strip to a primary point on a second outer edge of the strip opposite from the first outer edge;
    (ii) a second outer concave curved surface on an opposite side of the strip from the first outer convex curved surface that extends from a secondary point on the first outer edge of the strip to a secondary point on the second outer edge of the strip; and
    (iii) a thickness between the first outer convex curved surface and the second outer concave curved surface measured perpendicular to the second outer concave curved surface;
    wherein the thickness is greater at a midpoint of a cross-section centerline of the strip that it is at either edge of the strip.

2. The gasket of claim 1, wherein the strip is a first strip, wherein the gasket further comprises:
    a second strip comprising:
    (i) a first outer convex curved surface that extends from a primary point on a first outer edge of the second strip to a primary point on a second outer edge of the second strip opposite from the first outer edge;
    (ii) a second outer concave curved surface on an opposite side of the strip from the first outer convex curved surface that extends from a secondary point on the first outer edge of the second strip to a secondary point on the second outer edge of the second strip; and
    (iii) a thickness between the first outer convex curved surface and the second outer concave curved surface measured perpendicular to the second outer concave curved surface;
    wherein the thickness is greater at a midpoint of a cross-section centerline of the second strip than it is at either edge of the second strip;
    wherein the first outer convex curved surface of the first strip is adjacent to the second outer concave curved surface of the second strip;
    wherein the first and second strips are arranged as alternately wound spirals; and
    wherein the first strip comprises properties that are different from properties of the second strip.

3. The gasket of claim 1, further comprising a soft sealant material between adjacent windings of the spirally wound element.

4. The gasket of claim 3, further comprising a second soft sealant material extending over each opposed side of the spirally wound element.

5. The gasket of claim 4, wherein the sealing material between adjacent windings of the spirally wound element is a different material than the second soft sealing material that extends over each opposed side of the spirally wound element.

6. The gasket of claim 1, further comprising a soft sealant material extending over each opposed side of the spirally wound element.

7. The gasket of claim 1, wherein the second outer concave curved surface is continuously concave.

8. The gasket of claim 1, wherein the first outer convex curved surface consists of a convex arc, a first straight region adjacent to a first end of the convex arc and a second straight region adjacent to a second end of the convex arc, and wherein the second outer concave curved surface consists of a concave arc, a third straight region adjacent to a first end of the concave arc and a fourth straight region adjacent to a second end of the concave arc.

9. The gasket of claim 8, wherein the convex arc and the concave arc extend from a common axis.

10. The gasket of claim 8, wherein the convex arc comprises a convex axis and the concave arc comprises a concave axis, and wherein the concave and concave axes are spaced apart from each other.

11. The gasket of claim 10, wherein the convex axis and the concave axis are spaced apart from each other by a distance equal to the thickness of the strip measured at the midpoint of the cross-section centerline.

12. The gasket of claim 8, wherein the strip further comprises a central region in communication with first and second side regions, wherein the central region is defined by the convex arc and the concave arc, wherein the central region is centered around the midpoint of the strip, wherein the first and second side regions are disposed on opposite sides of the central region, wherein the first side region is defined by the first and third straight regions and the first outer edge of the strip and the second side region is defined by the third and fourth straight regions and the second outer edge of the strip, and wherein the thickness of the strip decreases from the midpoint of the strip to each side region.

13. The gasket of claim 12, wherein the thickness of the strip is constant in each side region.

14. The gasket of claim 12, wherein the thickness of the strip in each side region is greatest where the side region contacts the central region and the thickness decreases across the side region.

15. A method of effecting a seal between two opposed faces comprising placing the gasket of claim 1 between the two opposed faces.

16. A method of forming a seal arrangement comprising placing a gasket of claim 1 between two opposed faces, and securing the gasket between the two opposed faces.

17. A gasket for sealing opposed faces, the gasket comprising:
  a strip that is spirally wound to form a spirally wound element having a plurality of windings, the strip comprising
  (i) a first outer convex surface that extends from a first point on a first outer edge of the strip to a first point on an opposite outer edge of the strip, the first outer convex surface comprising a first convex arc comprising a first radius, a second convex arc comprising a second radius and adjacent to the first convex arc, and a third convex arc comprising a third radius and adjacent to the second convex arc, wherein the first radius and the third radius are the same, wherein the second radius is smaller than the first and third radii;
  (iii) a second outer concave surface on an opposite side of the strip from the first outer convex surface that extends from a second point on the first outer edge of the strip to a second point on the opposite outer edge of the strip, wherein the second outer concave surface comprises a concave arc; and
  (v) a thickness between the first outer convex surface and the second outer concave surface measured perpendicular to the second outer concave surface;
  wherein the thickness is at a maximum at a midpoint of a cross-section centerline of the strip.

18. The gasket of claim 17, wherein the concave arc comprises a concave radius and wherein the concave radius is substantially equal to the second radius of the convex curve.

19. The gasket of claim 17, wherein the second convex arc and the concave arc extend from a common axis.

20. The gasket of claim 17, wherein the second convex arc comprises a convex axis and the concave arc comprises a concave axis, and wherein the convex and concave axes are spaces apart from each other.

21. The gasket of claim 20, wherein the convex axis and the concave axis are spaced apart from each other by a distance equal to the thickness of the strip measured at the midpoint of the cross-section centerline.

* * * * *